United States Patent [19]

Winters

[11] 4,302,245
[45] Nov. 24, 1981

[54] METHOD FOR RECOVERING ZINC AND ZINC ALLOYS FROM AUTOMOBILE SCRAP

[75] Inventor: Frederic T. Winters, Palatine, Ill.

[73] Assignee: American Can Company, Greenwich, Conn.

[21] Appl. No.: 161,291

[22] Filed: Jun. 20, 1980

[51] Int. Cl.³ .......................... C22B 19/30; B03C 1/00
[52] U.S. Cl. .......................................... 75/86; 75/445; 75/63; 209/214
[58] Field of Search ..................... 75/44 S, 63, 86, 87, 75/88, 82; 209/214

[56] References Cited

U.S. PATENT DOCUMENTS 4,227,922  10/1980  Laws et al. ............................ 75/88

Primary Examiner—M. J. Andrews
Attorney, Agent, or Firm—Robert P. Auber; George P. Ziehmer; Paul R. Audet

[57] ABSTRACT

An improved method and apparatus for separating and recovering zinc and zinc alloy particles which are nickel plated from non-ferrous non-magnetic automotive scrap material. The scrap material is transported on a belt conveyor past a magnetic field where the path of the zinc particles with nickel are deflected into a path separated from the remaining scrap material. Subsequently the zinc and zinc alloy materials are recovered by a pyrometallurgical process.

7 Claims, 2 Drawing Figures

METHOD FOR RECOVERING ZINC AND ZINC ALLOYS FROM AUTOMOBILE SCRAP

This invention relates to the separation and recovery of zinc and zinc alloys combined in part with a mechanically or electrochemically bound magnetic material or coating and found in mixtures from non-magnetic automotive scrap and, in particular, to an improved method and apparatus for accomplishing same.

BACKGROUND OF THE INVENTION

Increased recovery of the metal values of junked cars began when the steel mills and iron foundries required and demanded a higher quality steel scrap. This was accomplished by shredding the car in a flying hammermill to liberate the mechanically bound constituents of the car from each other. Once liberation is achieved, the magnetic ferrous material is separated by the use of a magnetic field of low intensity, producing a valuable high quality iron scrap and a poor quality mixture of non-magnetic metals, plastics, and rubber. Aluminum, zinc, copper, brass, stainless steel and lead are valuable constituents of this non-magnetic shredded automotive scrap and several techniques have been developed for their recovery using the significantly different material densities by heavy media separation. This beneficiation technique takes advantage of low specific gravity, 2.7 grams per cubic centimeter of aluminum by introducing the above described scrap metal mix into a slurry consisting of water with suspended particles of ferrosilicon. When there is a sufficient quantity of ferrosilicon in the slurry, it will appear to the scrap to be a homogeneous fluid with a specific gravity greater than that of aluminum. As a result, the aluminum floats on top of the heavy media (i.e., water and ferrosilicon slurry) while the other non-magnetic constituents, i.e., zinc, copper, brass, lead, and stainless steel sink, thus facilitating the aluminum's separation from the scrap mix.

The metals which sink in this process are heavy non-magnetic materials and after removal from the heavy media ferrosilicon vessel, they are normally passed over a screen with openings of about three-quarters of an inch. The pieces of oversize (i.e., larger than ¾ inches) are then deposited on a conveyor belt where the zinc, copper, brass and lead are separated from each other by hand. The pieces of undersize (i.e., smaller than ¾ inches) are too small for hand sorters to effectively identify and hand sorting of this small material becomes uneconomical.

Several pyrometallurgical and hydrometallurgical techniques are available for recovery of the metal values in these undersize mixtures of small size fraction materials, more particularly the recovery of metal from this material mixture, is aimed at obtaining zinc from the mixture since it represents the largest component remaining.

Zinc possesses two properties that would appear to lend it to techniques for its separation from the non-ferrous scrap mix but unfortunately significant shortcomings in these techniques are apparent.

A pyrometallurgical technique which can be used with some success is selective melting. The zinc and zinc alloys in the mixture which have aluminum and copper as the alloying constituents, have melting temperatures on the order of 800° F. which is much lower than all the other non-magnetic constituents, which have melting temperatures which are greater than 1200° F., except for the lead and lead alloys present, which melt at about 620° F. It would appear that first the lead and then the zinc could be preferentially melted from the scrap mix and thus result in an effective metal separation. However, due to the small amount of lead present, about 4% by weight of the total mixture, and the manner in which the pieces of scrap pack together when introduced to the sweating furnace, the molten lead will not readily flow out of the scrap mixture. The result is that when the zinc is melted the residual lead will alloy with the molten zinc and contaminate it. Since the lead specification for zinc and zinc alloys is 0.005% maximum (see specification ASTM B86 for alloys AG40A and AC41), the resulting zinc product is not satisfactory from this selective melting process. Furthermore, significant metal losses due to oxidation are usually associated with preferential melting.

A hydrometallurgical technique thought to be of advantage for the separation of zinc from the metal mixture utilizes an acid environment where the zinc will act as a sacrificial anode and dissolve preferentially to the other more noble metals in the scrap mixture the dissolved zinc can then be recovered from the aqueous solution by electrowinning. Though technically feasible this hydrometallurgical technique would involve the handling of large quantities of acid, probably sulfuric, and require several unit operations such as dissolution, liquid-solid separation, solution purification, and electrowinning. Also to be considered is that even though the product of such a process would be a very pure metal, about 99.99% zinc, it is no more valuable than the alloys which were dissolved.

From the above discussion it is apparent that more suitable techniques are required to separate the valuable zinc and zinc alloy materials from the mixture of small size materials.

SUMMARY OF THE INVENTION

It is a primary object of the present invention to improve the recovery of zinc and zinc alloys from automotive scrap material.

It is a further object of the invention to provide method and apparatus for separating and removing zinc particles combined or coated, as by mechanical or electrochemical bonding, with a magnetic material from non-magnetic scrap material.

It is still a further object of the invention to utilize the strongly magnetic characteristics of nickel plating on zinc and zinc alloy automotive scrap particles to separate them from non-magnetic automotive scrap material.

It is still a further object of the present invention to provide method and apparatus for the separation of zinc and zinc alloys combined with nickel in automotive scrap from non-magnetic non-magnetic particles of the scrap materials, such as, copper, brass, lead and mixtures thereof.

The invention, generally speaking, is accomplished by transporting a heterogeneous scrap mixture including nickel coated zinc particles on a belt conveyor and applying a magnetic field of sufficient strength to the scrap mixture to deflect the zinc particles combined with nickel and separate them from the remaining non-magnetic scrap mixture so that the zinc and zinc alloys can be recovered subsequently by a pyrometallurgical process.

DETAILED DESCRIPTION OF A PREFERRED EMBODIMENT

Figure 1:
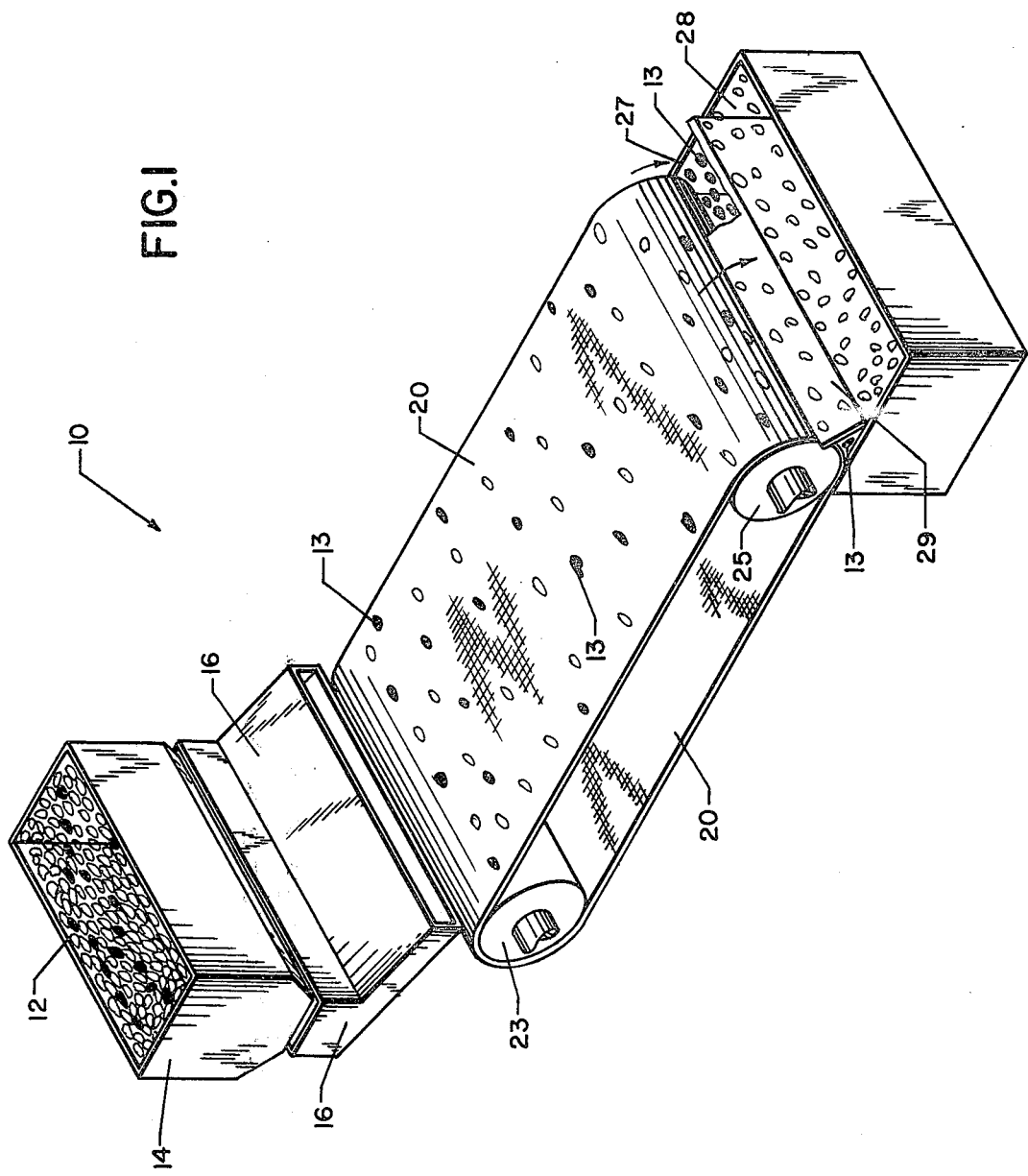
FIG. 1 is a perspective view of apparatus for a preferred embodiment of the present invention.

Referring now to FIG. 1, there is shown schematically a preferred embodiment of the separating apparatus of the invention generally designated 10 which separates zinc and zinc alloy particles combined with a magnetic material from automotive non-magnetic scrap material 12. The scrap material 12 nominally called $-\frac{3}{4}$ heavy non-ferrous consisting principally of the metals nickel plated zinc and zinc alloy particles designated 13, copper, brass, stainless steel, and lead is placed in feed hopper 14 from which it is mechanically distributed by the material feeder chute 16 to produce an evenly distributed mono-layer of material onto a moving belt conveyor 20 moving in the direction of the arrows.

Belt conveyor 20 is wrapped around pulleys 23 and 25 one of which is driven by any suitable drive mechanism at a predetermined speed. Pulley 25 is electromagnetic which generates a magnetic field of sufficient strength such that zinc particles 13 plated with nickel will be deflected from the normal path of the scrap material. Zinc particles 13 are directed to the path of the belt conveyor 20 around roller 25 and fall by their weight into a container 27. It has been found that a magnetic field of at least 1500 Gauss is sufficient for this purpose. The remaining scrap material will be unaffected by the magnetic field and will follow a trajectory which passes into a container 28. A splitter member 29 serves to further separate the zinc particles from the remaining non-magnetic scrap material.

It has been found that the scrap left after normal magnetic separation of $-\frac{3}{4}$ inch automobile scrap contains a minimum of 11% nickel-coated zinc and that such nickel-coated zinc exhibits magnetic properties in highly magnetic fields having strength in excess of 1500 Gauss. By the above invention the nickel-plated zinc is separated from the material, which is presently thrown out. When the zinc is melted the separated nickel plate will float to the surface and it can be removed by skimming. Zinc obtained by this method can be sold directly or remelted into an ingot and then sold. The amount of material used as landfill or sold at a reduced price can be decreased by a minimum of 10%. It is estimated that approximately 50 to 150 tons of additional zinc per month can be recovered by this invention.

Figure 2:
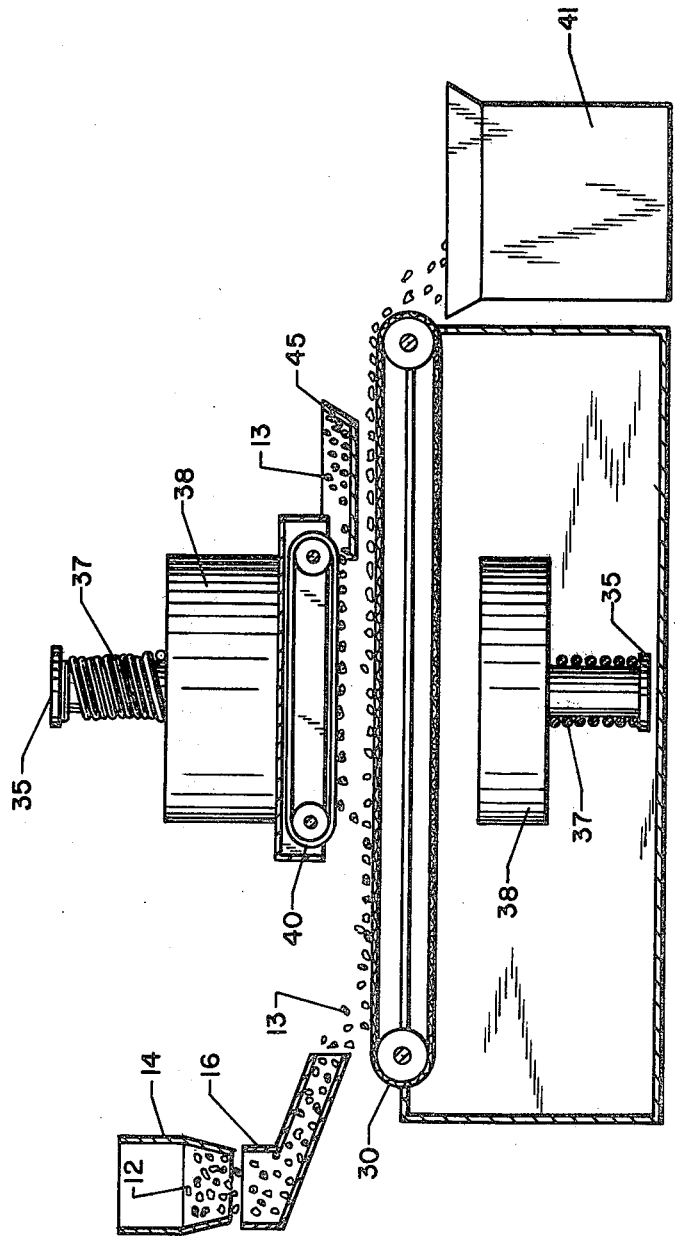
FIG. 2 is a schematic view of apparatus illustrating another embodiment of the invention.

In FIG. 2 there is shown an alternative embodiment of the invention. Scrap material 12 including nickel plated zinc particles 13 is placed in feed hopper 14 for distribution by feed chute 16 onto a belt conveyor 30. The belt conveyor 30 presents the evenly distributed material 12 underneath electromagnet members 35 which produce an electromagnetic field by the application of electrical energy to magnetically wound field coils 37. The electromagnetic field produced is passed through appropriate magnetic pole members 38 to produce a magnetic field density at the surface of the belt conveyor 30. The scrap material upon being introduced into the high density magnetic field result in the magnetic attraction of the nickel plated or coated zinc and zinc alloy particles 13 and their attachment to a high field magnetic conveyor 40. The balance of scrap material on the belt conveyor 30 continues to travel through the high density magnetic field unaffected by the said magnetic field and is removed to a storage container 41. However, the nickel plated zinc particles 13 are attached to the high field conveyor 40 and are carried by the conveyor past the belt conveyor 40 where they leave the influence of the high density magnetic field and fall into a storage container 45. The structural arrangement shown in FIG. 2 is such that the proximity of the field is an important consideration, consequently, the particle size should be sufficiently small such that the air gap between magnet and metal is minimal. Subsequently the particles 13 can be effectively utilized in pyrometallurgical processes where the zinc and zinc alloys are melted and the fine nickel plate on the surface which is not melted can be removed by skimming of the slag.

It should be apparent from the foregoing description that the present invention provides a novel method and apparatus for selectively separating small pieces of nickel plated zinc and zinc alloy materials from a heterogeneous metal scrap mixture thereof with non-magnetic metal components. Although only a preferred embodiment specifically illustrated and described herein, it will be appreciated that many modifications and variations of the present invention are possible in light of the above teaching to those skilled in the art.

What is claimed is:

1. A method of separating and removing zinc particles coated with a relatively thin layer of magnetic material from a heterogeneous scrap mixture thereof with particles of non-magnetic materials, comprising the steps of:

supplying a heterogeneous mixture including said zinc particles coated with magnetic material, and said particles of non-magnetic materials onto a moving conveyor;

exposing said scrap mixture on said moving conveyor to a magnetic field of strength sufficient to separate the moving zinc particles coated with magnetic material from the moving particles of non-magnetic materials; and removing the separated zinc particles into a collection zone separate from the remaining particles of non-magnetic materials of said mixture.

2. A method according to claim 1 wherein said magnetic material is nickel plating on said zinc particles.

3. A method according to claim 2, wherein the particles of non-magnetic materials include any of aluminum, lead, brass, stainless steel, cooper or combinations thereof.

4. A method according to claim 1 wherein the strength of the magnetic field is at least 1500 Gauss.

5. A method of separating and removing zinc particles, having on at least portions thereof relatively thin coatings of nickel, from a mixture of said zinc particles with particles of non-magnetic materials, comprising the steps of:

placing a mono-layer of such a mixture on a moving conveyor;

subjecting said mixture on said conveyor to a magnetic field of strength sufficient magnetically to attract said zinc particles and separate the latter from the particles of non-magnetic materials; and directing said magnetically attracted, separated zinc particles into a collection zone.

6. A method according to claim 5, wherein said non-magnetic materials include any of alluminum, lead, brass, stainless steel, copper, or combinations thereof.

7. A method for separating and removing zinc particles having a relatively thin nickel coating thereon from a heterogeneous scrap mixture thereof with particles of non-magnetic material, comprising the steps of:

supplying a heterogeneous scrap mixture of particles smaller than ¾ inch size, including said non-magnetic particles and said zinc particles having relatively thin nickel coatings;

evenly distributing a mono-layer of scrap mixture of particles onto a conveyor belt for transport of said mixture along a predetermined path;

subjecting said scrap mixture, as it is moved along said predetermined path, to a magnetic field of strength sufficient magnetically to separate the moving zinc particles coated with nickel from the non-magnetic particles; and collecting said zinc particles as they are separated.

* * * * *